United States Patent Office 3,510,430
Patented May 5, 1970

3,510,430
COMPOSITIONS FOR TREATING ALUMINUM SURFACES
Floyd L. Mickelson and Robert W. Bland, Chicago, Ill., assignors to The Diversey Corporation, Chicago, Ill., a corporation of Illinois
No Drawing. Filed May 22, 1967, Ser. No. 640,370
Int. Cl. C09k 3/00
U.S. Cl. 252—79.1                                8 Claims

ABSTRACT OF THE DISCLOSURE

Provided are compositions and solutions containing ferric sulfate, an alkali metal bisulfate, an alkali metal nitrate and an alkali metal silicofluoride for desmutting aluminum surfaces.

---

This invention relates to the art of treating metal surfaces. More particularly, this invention is concerned with novel compositions and processes for treating the surfaces of aluminum and aluminum based alloys to condition such surfaces for subsequent treatment.

One of the ways of preparing the surface of aluminum for further processing is to etch the surface in an alkali solution. After etching, a fine particulate material remains on the surface of the aluminum. This material is referred to as "smut." The material is dust-like, loosely held on the surface and often can be easily rubbed off. The composition of the smut varies with the alloy but generally is composed of the oxides of any alloying metals, including silicon oxide, as well as aluminum oxide and those metallic compounds that do not dissolve during the etching. The smut dulls the metal surface and, if not removed, subsequent deposits of chemical conversion coatings, such as chromate coatings or paint applications, will not be uniform and will be loosely held where the smut is not removed.

Treatment of aluminum alloy surfaces with conventional acid deoxidizers fails to satisfactorily remove high temperature oxides formed during various fabricating and forming operations. A solution of nitric acid or chromic acid is commonly used for this purpose. Such solutions are highly reactive and within 30 seconds can etch the surface to such a degree as to render it unfit for further processing. Even when carried out carefully, subsequent chemical coatings are irregular and far from satisfactory. Chromic acid type deoxidizers also cause disposal problems because of the stream pollution they can cause.

Chemical deoxidizers are not only used to remove smut but also to prepare aluminum surfaces for subsequent resistance welding. For such preparation, a prior caustic etch is not required in most instances so no smut is formed to be removed afterwards by the deoxidizer. Deoxidizers are accordingly used to prepare the aluminum surface immediately after precleaning to remove dirt and grease. An effective deoxidizer for this purpose must remove surface oxides effectively to reduce electrical resistance to acceptable levels for producing secure welds with minimum power consumption.

According to the present invention, there are provided novel compositions and methods which can be used to desmut or deoxidize aluminum surfaces.

It has been found that the surfaces of aluminum can be deoxidized and desmutted by bringing the aluminum surface into contact with an aqueous solution of the following composition:

| | Percent by weight |
|---|---|
| Ferric sulfate | 50–75 |
| Alkali metal bisulfate | 5–30 |
| Alkali metal nitrate | 5–24 |
| Alkali metal silicofluoride | 1–8 | with the percentages being on an anhydrous basis. Aqueous solutions of such compositions will deoxidize and desmut aluminum quickly.

The novel aqueous solutions provided by this invention dissolve oxides and surface impurities without detrimentally attacking the aluminum.

Furthermore, by including one or more surfactants in the compositions, precleaning of the aluminum before deoxidizing it can be eliminated and both cleaning and deoxidizing effected simultaneously.

Either sodium bisulfate or potassium bisulfate, or mixtures thereof, can be used in the compositions. Sodium bisulfate is advisably used because it is less expensive.

Similarly, sodium nitrate or potassium nitrate or mixtures thereof can be used but for economic reasons sodium nitrate is preferred.

Again, either sodium silicofluoride or potassium silicofluoride or mixtures thereof can be used in the compositions. For cost reasons, sodium silicofluoride is preferred.

Although other fluorides were tried in the compositions as substitutes for the silicofluorides, none of them were found to be as satisfactory. Sodium bifluoride tended to etch the aluminum and in aluminum alloys such as 2024, 6061 and 7075 this etching produced a dark smut. Also, sodium silicofluoride gave better deoxidizing results than sodium bifluoride in compositions which were otherwise as described above.

The inclusion of an alkali metal nitrate in the compositions is an important feature of the invention. The nitrate overcomes pitting, which is a particularly common problem in deoxidizing certain aluminum alloys, one such being 6061-T6.

The compositions provided by this invention are readily prepared by intermixing the components using conventional procedures. For ready handling, the compositions are advisably prepared as granular mixtures.

Although compositions can be used having the broad range of ingredients as previously described, it is usually more advantageous to employ compositions within the following amounts:

| | Percent by weight |
|---|---|
| Ferric sulfate | 50–70 |
| Alkali metal bisulfate | 15–25 |
| Alkali metal nitrate | 10–20 |
| Alkali metal silicofluoride | 1–5 |

The compositions of this invention are conveniently used in treating aluminum according to novel methods employing novel working solutions or use solutions prepared by dissolving the compositions in water.

Novel working solutions are suitably produced by dissolving a sufficient amount of a composition of this invention in water to provide 4.0 g. to 45.0 g. of nitrate ions per gallon, 0.4 g. to 15.0 g. of fluoride ions per gallon, 0.4 g. to 2.0 g. of hydrogen ions per gallon and 8.0 g. to 60.0 g. of ferric ions per gallon. Such working solutions can be used to deoxidize and desmut aluminum surfaces. On a more readily calculable basis, it is generally suitable to dissolve from about 2 to 16 ounces of the composition per gallon of water to form a suitable working solution.

Treatment of aluminum surfaces with such working solutions can be effected at any suitable temperature. Generally, solution temperatures from about room temperature to 180° F. are most suitable with immersion contact times of from about 0.5 to 10 minutes being sufficient. Following treatment, the aluminum surface can be rinsed with water and air dried.

EXAMPLE 1

A solid granular composition is prepared by intermixing the following ingredients:

| Ingredients: | Percent by weight |
|---|---|
| Ferric sulfate | 59.0 |
| Sodium bisulfate | 21.0 |
| Sodium nitrate | 15.0 |
| Sodium silicofluoride | 5.0 |
| | 100.0 |

Such a composition gives rapid, thorough desmutting of aluminum after alkali etching. It is most suitably used on aluminum alloys that do not have a high silicon content.

Working solutions of the composition are prepared by dissolving about 2 to 16 ounces of the composition per one gallon of water. The working solutions are used at about room temperature (70°–80° F.).

Prior to desmutting, the aluminum object is precleaned to remove dirt and grease and then etched with a caustic etch bath followed by a water rinse. An etching bath can comprise about 6 ounces of alkali per gallon at a temperature of 140–150° F. An etching time of 3 minutes is suitable.

Following the alkali etching the aluminum object can be dipped into the desmutting working solution at 75° F. The time needed to effect desmutting will vary with the aluminum alloy being treated and the concentration of the working solution as shown by the following table.

| Aluminum alloy [1] | Desmutting time at 75° F. | |
|---|---|---|
| | 8 oz./gal. | 16 oz./gal. |
| 1100-0 | 30 secs. | 30 secs. |
| 2024-0 and 2024-T3 | 5-7 mins. | 4-5 mins. |
| 3003-0 | 1 min. | 30 secs. |
| 5052-0 | 1 min. | 30 secs. |
| 6061-T6 | 3-4 mins. | 2-3 mins. |
| 6063-T6 | 30 secs. | 30 secs. |
| 7075-0 and 7075-T6 | 3-4 mins. | 2-3 mins. |

[1] The composition of some of these alloys is as follows:
```
1100-0           99.0+Al.
2024-0 and
  2024-T3        4.5% Cu, 1.5% Mg, 0.6% Mn, bal. Al.
3003-0           1.2% Mn, bal. Al.
5052-0           2.5% Mg, 0.25% Cr, bal. Al.
6061             1% Mg, 0.6% Si, 0.25% Cu, 0.25% Cr, bal. Al.
6063-T6          0.7% Mg, 0.4% Si, bal. Al.
7075-0 and
  7075-T6        5.5% Zn, 2.5% Mg, 1.5% Cu, 0.3% Cr, bal. Al.
```

The desmutting times given above are those required if no agitation is given during the desmutting operation. Moderate agitation during desmutting will reduce the times required by approximately 25%.

The desmutting working solutions can also be used to deoxidize aluminum surfaces prior to resistance welding.

(1) Deoxidizing unetched aluminum surfaces

The aluminum surfaces are cleaned to remove dirt and grease, rinsed and deoxidized with the working solution of the composition given above at 16 oz./gal. and 75° F. for 5 minutes, rinsed in cold water and air dried.

The average surface resistance obtained with various aluminum alloys is as follows:

SURFACE RESISTANCE VALUES (MICROHMS, AVERAGE OF FIVE READINGS) OBTAINED WITH VARIOUS ALUMINUM ALLOYS

| Aluminum alloy | Initial surface resistance | Surface resistance after 24 hours |
|---|---|---|
| 1100-0 | 5 | 5 |
| 2024-0 | 15 | 15 |
| 2024-T3 | 13 | 15 |
| Alclad 2024-T3 | 20 | 62 |
| 3003-0 | 5 | 5 |
| 5052-0 | 5 | 5 |
| 6061-T6 | 49 | 57 |
| 6063-T6 | 10 | 12 |
| 7075-T6 | 10 | 25 |
| Alclad 7075-T6 | 11 | 22 |

(2) Deoxidizing etched aluminum sulfaces

Aluminum alloys which have not been heat treated are precleaned to remove dirt and grease, rinsed with water, etched with an alkali bath at 6 oz./gal. for 3 minutes at 150° F., rinsed with water and deoxidized using the working solution of the composition of this example at 16 oz./gal., rinsed in cold water and air dried. The average surface resistance obtained with various aluminum alloys is as follows:

SURFACE RESISTANCE VALUES (MICROHMS, AVERAGE OF FIVE READINGS) OBTAINED WITH ETCHED ALUMINUM ALLOYS THAT HAVE NOT BEEN HEAT TREATED

| Aluminum alloy | Initial surface resistance | Surface resistance after 24 hours |
|---|---|---|
| 1100-0 | 12 | 14 |
| 2024-0 | 5 | 6 |
| 3003-0 | 14 | 14 |
| 5052-0 | 9 | 13 |
| 7075-0 | 5 | 19 |

EXAMPLE 2

A solid granular composition containing surfactants is prepared by intermixing the following ingredients:

| Ingredients: | Percent by weight |
|---|---|
| Ferric sulfate | 69.0 |
| Sodium nitrate | 15.0 |
| Sodium bisulfate | 10.0 |
| Sodium silicofluoride | 1.0 |
| Aliphatic polyether (Antarox BL–330) | 1.0 |
| Docyl benzene sulfonic acid | 1.0 |
| Isooctyl phenyl polyethoxy ethanol (OPE 9–10) (Triton X–100) | 1.0 |
| Ethylene glycol ethyl ether (Dowanol EE solvent | 2.0 |

A desmutting working solution is prepared by dissolving the composition in water at 6 oz./gal. (pH 1.6–1.7) and heating the solution to 160° F.

Prior to desmutting, the aluminum surfaces are precleaned to remove dirt and grease, rinsed with water, etched with a 6 oz./gal. alkali solution at 150° F. and rinsed with water. The aluminum is then desmutted with the previously prepared working solution. Desmutting times obtained are as follows:

Aluminum alloy:
    1100-0—10-15 secs.
    2024-T3—3-3½ mins.
    3003-0—1 min.
    5052-0—30 secs.
    6061-T6—2½-3 mins.
    6063-T6—10-15 secs.
    7075-T6—2¼-2¾ mins.

Even better desmutting is obtained at 8 oz./gal. of the composition in the working solution.

The composition of this example can also be used to simultaneously clean and deoxidize aluminum surfaces.

A combination cleaning-deoxidizing solution is prepared by adding 6 ounces of the composition per gallon of water and heating the solution to 160° F. Treatment times of 5–10 minutes are suitable after which the aluminum is rinsed with cold water and air dried. By using this procedure, the results reported in the following table are obtained.

SURFACE RESISTANCE VALUES (MICROHMS–AVERAGE OF FIVE READINGS) OF UNETCHED ALUMINUM ALLOYS

| Aluminum alloy | 5 min. treatment | | 10 min. treatment | |
|---|---|---|---|---|
| | Initial surface resistance value | Value after 24 hrs. | Initial surface resistance value | Value after 24 hrs. |
| 1100-0 | 5 | 11 | 12 | 16 |
| 2024-T3 | 5 | 50 | 6 | 20 |
| Alclad 2024-T3 | 39 | 370 | 75 | 600 |
| 3003-0 | 1 | 1 | 11 | 37 |
| 5052-0 | 5 | 34 | 8 | 69 |
| 6061-T6 | 7 | 44 | 12 | 72 |
| 6063-T6 | 5 | 15 | 8 | 22 |
| 7075-T6 | 6 | 19 | 8 | 61 |
| Alclad 7075-T6 | 12 | 88 | 6 | 75 |

All alloys cleaned satisfactorily without pitting or discoloration.

Using the working solution at 140° F. usually requires a 10 minute treatment. Treatment at 180° F. for 5 minutes is also satisfactory but discoloration or smut may form with some alloys such as 2024–T3 and 7075–T6 aluminum but treatment below 5 minutes at 180° F. is generally suitable for these alloys. At 200° F. discoloration and smut form on some alloys so use of the working solutions at this temperature is not recommended.

EXAMPLE 3

Granular solid mixtures having the following compositions are prepared:

| Ingredients | Percent by weight | | |
|---|---|---|---|
| | A | B | C |
| Ferric sulfate | 59.0 | 59.0 | 75.0 |
| Sodium bisulfate | 21.0 | 21.0 | 20.0 |
| Sodium nitrate | 15.0 | 15.0 | |
| Sodium bifluoride | | 5.0 | 5.0 |
| Sodium silicofluoride | 5.0 | | |

Aluminum coupons are precleaned to remove dirt and grease and then deoxidized in solutions of compositions A, B and C at 16 oz./gal. at 75° F. for 5 minutes, rinsed with cold water and dried. The surface resistance of the unetched aluminum coupons is then measured (average of five readings) with the result reported in the following table.

SURFACE RESISTANCE VALUES (MICROHMS–AVERAGE OF FIVE READINGS) OF UNETCHED ALUMINUM ALLOYS

| Aluminum Alloy | A | | B | | C | |
|---|---|---|---|---|---|---|
| | Initial value | After 24 hrs. | Initial value | After 24 hrs. | Initial value | After 24 hrs. |
| 1100-0 | 5 | 5 | 10 | 8 | 15 | 16 |
| 2024-T3 | 10 | 18 | 13 | 17 | 15 | 15 |
| Alclad 2024-T3 | 20 | 62 | 203 | 205 | 77 | 322 |
| 3003-0 | 5 | 5 | 9 | 12 | 5 | 5 |
| 5052-0 | 5 | 5 | 9 | 9 | 15 | 15 |
| 6061-T6 | 49 | 57 | 103 | 159 | 39 | 54 |
| 6063-T6 | 10 | 12 | 8 | 8 | 4 | 10 |
| 7075-T6 | 10 | 25 | 44 | 106 | 15 | 16 |
| Alclad 7075-T6 | 11 | 22 | 103 | 159 | 118 | 137 |

No pitting was noted on any of the deoxidized aluminum coupons. Compositions B and C, both of which contain sodium bifluoride, produced a dark smut on the deoxidized 6061–T6 aluminum. Component A, which contains sodium silicofluoride, did not produce any smut.

Sodium silicofluoride, present in Composition A, gave markedly better deoxidizing results than sodium bifluoride used in Compositions B and C.

The deoxidizing ability of Compositions A and C on etched non-heat treated aluminum alloys is determined by precleaning aluminum coupons to remove dirt and grease, etching the coupons with an alkali solution at 6 oz./gal. and 150° F. for 3 minutes, rinsing the coupons with water and deoxidizing the coupons with working solutions of Compositions A and C at 16 oz./gal. and 75° F. for 5 minutes. The following results are obtained.

SURFACE RESISTANCE VALUES (MICROHMS–AVERAGE OF 5 READINGS) OF ETCHED ALUMINUM ALLOYS

| Aluminum Alloy | A | | C | |
|---|---|---|---|---|
| | Initial value | After 24 hours | Initial value | After 24 hours |
| 1100-0 | 12 | 14 | 18 | 18 |
| 2024-0 | 5 | 6 | 18 | 18 |
| 3003-0 | 14 | 14 | 33 | 105 |
| 5052-0 | 9 | 13 | 18 | 30 |
| 7075 | 5 | 19 | 10 | 25 |

The data shows Composition A gives better deoxidization than Composition C.

What is claimed is:

1. A solid composition for dissolving in water for desmutting aluminum and aluminum alloys, said composition consisting essentially of:

| | Percent by weight |
|---|---|
| Ferric sulfate | 50–75 |
| Alkali metal bisulfate | 5–30 |
| Alkali metal nitrate | 5–24 |
| Alkali metal silicofluoride | 1–8 |

2. A solid composition according to claim 1 in which the ingredients are within the ranges:

| | Percent by weight |
|---|---|
| Ferric sulfate | 50–70 |
| Alkali metal bisulfate | 15–25 |
| Alkali metal nitrate | 10–20 |
| Alkali metal silicofluoride | 1–5 |

3. A composition according to claim 2 in which the alkali metal in each ingredient is sodium.

4. A solid composition according to claim 1 having the composition:

| | Percent by weight |
|---|---|
| Ferric sulfate | 59–69 |
| Sodium bisulfate | 10–21 |
| Sodium nitrate | 10–20 |
| Sodium silicofluoride | 1–5 |

5. A working aqueous solution for desmutting aluminum and aluminum alloys consisting essentially of about 4.0 to 45.0 g. of nitrate ions supplied as an alkali metal nitrate per gallon of solution, about 0.4 to 15.0 g. of fluoride ions supplied as an alkali metal silicofluoride per gallon of solution, about 0.4 to 2.0 g. of hydrogen ions supplied by an alkali metal bisulfate per gallon of solution and about 8.0 to 60.0 g. of ferric ions supplied as ferric sulfate per gallon of solution.

6. A working aqueous solution for desmutting aluminum and aluminum alloys containing about 2 to 16 ounces per gallon of solution of a composition consisting essentially of:

| | Percent by weight |
|---|---|
| Ferric sulfate | 50–75 |
| Alkali metal bisulfate | 5–30 |
| Alkali metal nitrate | 5–24 |
| Alkali metal silicofluoride | 1–8 |

7. A method of desmutting aluminum including aluminum alloys which comprises contacting the aluminum surface with an aqueous solution consisting essentially of about 4.0 to 45.0 g. of nitrate ions supplied as an alkali metal nitrate per gallon of solution, about 0.4 to 15.0 g. of fluoride ions supplied as an alkali metal silicofluoride per gallon of solution, about 0.4 to 2.0 g. of hydrogen ions supplied by an alkali metal bisulfate per gallon of solution and about 8.0 to 60.0 g. of ferric ions supplied as ferric sulfate per gallon of solution.

8. A method of desmutting aluminum including aluminum alloys which comprises contacting the aluminum surface with an aqueous solution containing about 2 to 16 ounces per gallon of solution of a composition consisting essentially of:

| | Percent by weight |
|---|---|
| Ferric sulfate | 50–75 |
| Alkali metal bisulfate | 5–30 |
| Alkali metal nitrate | 5–24 |
| Alkali metal silicofluoride | 1–8 |

References Cited

UNITED STATES PATENTS

| 2,975,039 | 3/1961 | Elliott | 156—22 |
| 3,326,803 | 6/1967 | Kelly et al. | 134—3 XR |
| 3,373,114 | 3/1968 | Grunwald | 252—79.1 |

MAYER WEINBLATT, Primary Examiner

U.S. Cl. X.R.

134—3; 156—21, 22, 23; 252—105